(12) United States Patent
Isani

(10) Patent No.: US 8,589,942 B2
(45) Date of Patent: Nov. 19, 2013

(54) NON-REAL TIME THREAD SCHEDULING

(75) Inventor: Tarik Isani, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 12/794,579

(22) Filed: Jun. 4, 2010

(65) Prior Publication Data

US 2011/0276979 A1 Nov. 10, 2011

Related U.S. Application Data

(60) Provisional application No. 61/332,734, filed on May 7, 2010.

(51) Int. Cl.
G06F 9/46 (2006.01)

(52) U.S. Cl.
USPC .......................................................... 718/107

(58) Field of Classification Search
None
See application file for complete search history.

(56) References Cited

U.S. PATENT DOCUMENTS

| | | | |
|---|---|---|---|
| 5,450,098 A | 9/1995 | Oz | |
| 5,528,513 A * | 6/1996 | Vaitzblit et al. | 718/103 |
| 5,928,322 A * | 7/1999 | Bitar et al. | 718/103 |
| 6,317,774 B1 * | 11/2001 | Jones et al. | 718/107 |
| 7,747,097 B2 | 6/2010 | Van Baarsen et al. | |
| 2002/0002667 A1 | 1/2002 | Kelsey et al. | |
| 2005/0184993 A1 | 8/2005 | Ludwin et al. | |
| 2006/0165181 A1 | 7/2006 | Kwan et al. | |
| 2007/0074216 A1 * | 3/2007 | Adachi et al. | 718/102 |
| 2011/0280315 A1 | 11/2011 | Isani et al. | |

OTHER PUBLICATIONS

IPC Control for Multiple Real-Time Threads on an In-Order SMT Processor Jorg Mische, Sascha Uhrig, Florian Kluge, and Theo Ungerer HiPEAC '09, pp. 125-139 Published: Jan. 2009.*
The Ubicom IP3023™ Wireless Network Processor: A Next-Generation Packet Processor for Wireless Networking Ubicom Published: 2003.*

* cited by examiner

Primary Examiner — Emerson Puente
Assistant Examiner — Paul Mills
(74) Attorney, Agent, or Firm — Peter Michael Kamarchik; Nicholas J. Pauley; Joseph Agusta

(57) ABSTRACT

A hard real time (HRT) thread scheduler and a non-real time (NRT) thread scheduler for allocating processor resources among HRT threads and NRT threads are disclosed. The HRT thread scheduler communicates with a HRT thread table including a plurality of entries specifying a temporal order for allocating execution cycles to one or more HRT threads. If a HRT thread identified by the HRT thread table is unable to be scheduled during the current execution cycle, the NRT thread scheduler accesses an NRT thread table which includes a plurality of entries specifying a temporal order for allocating execution cycles to one or more NRT threads. In an execution cycle where a HRT thread is not scheduled, the NRT thread scheduler identifies an NRT thread from the NRT thread table and an instruction from the identified NRT thread is executed during the execution cycle.

14 Claims, 4 Drawing Sheets

TIME under US 8,589,942 B2

NON-REAL TIME THREAD SCHEDULING

CROSS-REFERENCE TO RELATED APPLICATIONS

This application claims priority from U.S. Provisional Patent Application No. 61/332,734, filed on May 7, 2010, which is incorporated by reference herein in its entirety.

FIELD OF THE INVENTION

The invention relates generally to embedded processor architecture, and more particularly to allocation of processor resources.

BACKGROUND OF THE INVENTION

Multithreaded processors allow processor resources to be allocated among multiple threads, each thread including instructions for execution by the processor. Conventional approaches to allocating processor resources attempt to equally divide processor resources between different threads. This round-robin approach to scheduling results in nearly symmetric allocation of processor resources to different threads.

While certain configurations allow specified threads to have deterministic performance, processor resources not used by the specified threads are commonly evenly distributed among the remaining threads. However, symmetric execution of different threads may not optimally use processor resources. For example, symmetric allocation of processor resources would be inefficient if a first thread includes instructions from a primary operating system and a second thread includes instructions from a maintenance operating system. In this example, the primary operating system would be more frequently used while the maintenance operation would be less frequently used. Hence, asymmetric allocation of processor resources among different types of threads is beneficial.

SUMMARY OF THE INVENTION

A hard real time (HRT) thread scheduler and a non-real time (NRT) thread scheduler allocate processor resources among HRT threads and NRT threads. The HRT thread scheduler communicates with a HRT thread table including a plurality of entries specifying a temporal order in which execution cycles are allocated to one or more HRT threads. If the HRT thread scheduler determines that a HRT thread identified by the HRT thread table is unable to be scheduled during the current execution cycle, the NRT thread scheduler accesses an NRT thread table. The NRT thread table includes a plurality of entries specifying a temporal order in which execution cycles are allocated to one or more NRT threads. In an execution cycle where a HRT thread is not scheduled, the NRT thread scheduler identifies an NRT thread from the NRT thread table. Responsive to the NRT thread scheduler determining that the identified NRT thread may be scheduled, a thread selector retrieves an instruction associated with the NRT thread from a memory for execution.

In an embodiment, a round-robin scheduler is also used to further allocate processor resources between NRT threads. If the NRT thread scheduler determines that an NRT thread identified by the NRT thread table is unable to be scheduled during an execution cycle, the round-robin scheduler identifies an NRT thread for execution. The round-robin scheduler associates a priority level with each NRT thread, and identifies the NRT thread associated with the highest priority level. The thread selector then retrieves from the memory an instruction from the identified NRT thread associated with the highest priority level that is able to be scheduled. Hence, instructions from a high priority NRT thread that are not eligible for scheduling, such as instructions that are waiting for an interrupt or a cache miss, are not scheduled by the round-robin scheduler, but the highest priority NRT thread including an instruction able to be scheduled is retrieved from the memory by the round-robin scheduler. After retrieval of the instruction from the identified NRT thread associated with the highest priority level the round-robin scheduler associates a lowest priority level with the NRT thread scheduled by the round-robin scheduler.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
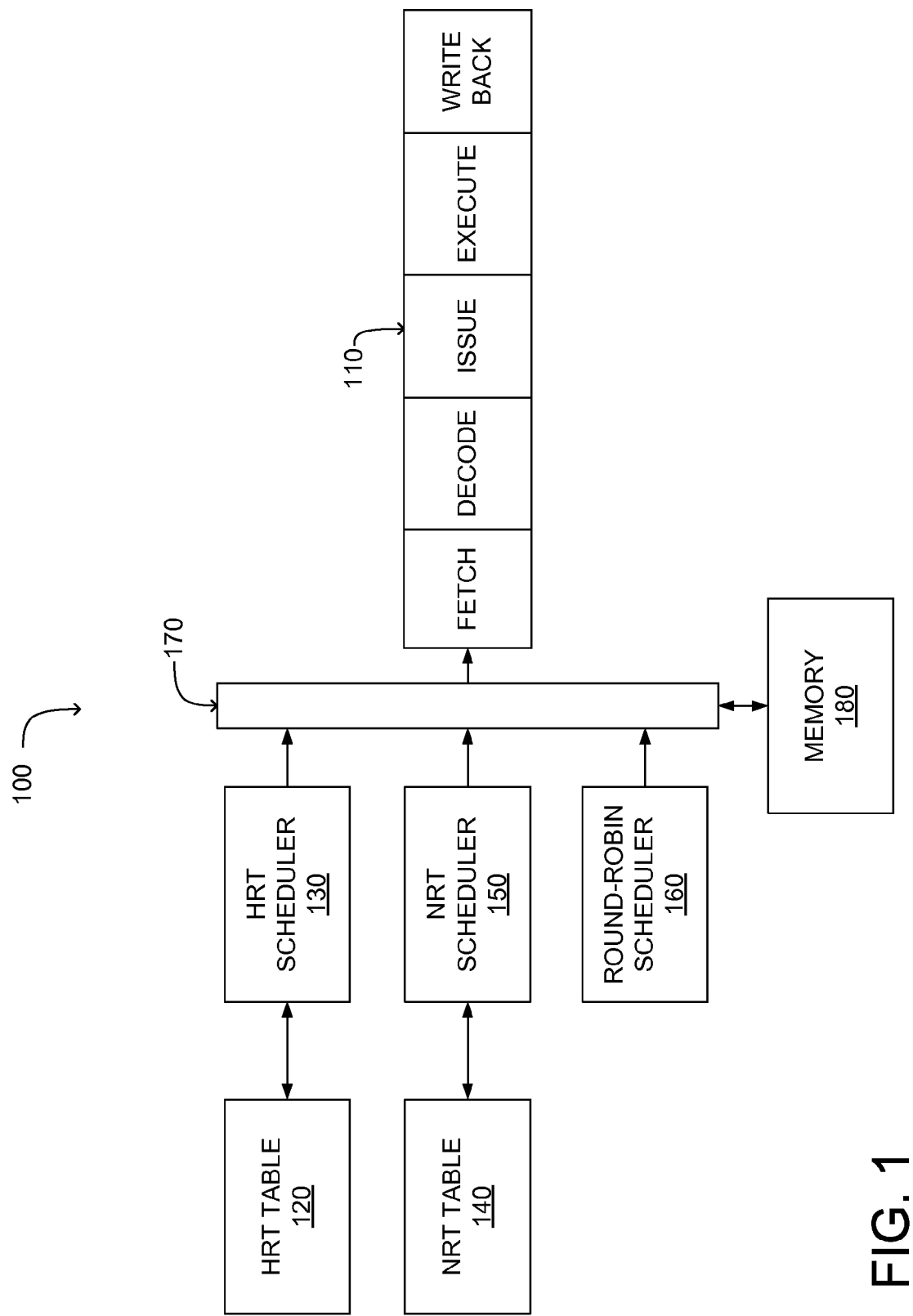
FIG. 1 is a block diagram of thread selection hardware in an embedded processor according to one embodiment of the present invention.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

A preferred embodiment of the present invention is now described with reference to the Figures where like reference numbers indicate identical or functionally similar elements. Also in the Figures, the left most digit of each reference number correspond to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

System Architecture

FIG. 1 is a block diagram of thread selection hardware 100 in an embedded processor according to one embodiment of the present invention. In the embodiment illustrated by FIG. 1, the thread selection hardware 100 includes a pipeline 110, a hard real time (HRT) thread scheduling table 120, a HRT scheduler 130, a non-real time (NRT) thread scheduling table 140, a NRT scheduler 150, a round-robin scheduler 160, a thread selector 170 and a memory 180. However, in other embodiments, the thread selection hardware 100 may include additional components than those shown in FIG. 1.

The pipeline 110 includes multiple stages, allowing simultaneous execution of multiple instructions from multiple threads using different stages. For example, the pipeline 110 includes a fetch stage, a decode stage, an issue stage, an execute stage and a write back stage. The fetch stage retrieves instructions from memory. The decode stage identifies the instruction function to be performed and identifies the resources for performing the identified function. For example, the decode stage identifies the registers, buses and/or functional units for performing the identified instruction. The issue stage reserves the identified resources for performing the identified function. For example, the issue stage maintains pipeline control interlocks and reads operands from registers. Instructions are executed in the execute stage. Although FIG. 1 depicts a single execute stage, in other implementations the pipeline 110 includes multiple execute stages. In the write back stage, the results of instruction execution are written into registers. In other embodiments, the pipeline 110 may be longer than the example shown in FIG. 1. For example, the pipeline 110 may include multiple fetch, decode, issue, execute and/or writeback stages.

In one embodiment, the thread selection hardware 100 includes a hard real time (HRT) thread scheduler 130 and a non-real time (NRT) thread scheduler 150. The HRT thread scheduler 130 is further described in U.S. patent application Ser. No. 09/748,098, which is incorporated by reference herein in its entirety. HRT threads scheduled by the HRT thread scheduler 130 have the highest priority for receiving processor resources, allowing deterministic performance of the HRT threads included in the HRT thread table 120. The HRT thread scheduler 130 is coupled to a HRT thread table 120 where each entry in the table represents a processor execution cycle. While FIG. 1 shows the HRT thread table 120 coupled to the HRT thread scheduler 130, in other embodiments the HRT thread table 120 is included in the HRT thread scheduler 130.

To identify an execution cycle for execution of a HRT thread, the HRT thread table 120 associates a thread identifier with an entry in the HRT thread table 120, as each entry in the HRT thread table 120 corresponds to an execution cycle. In an embodiment, the HRT thread table 120 has a variable length, for example it includes entries for 64 execution cycles. When the end of the HRT thread table 120 is reached, the HRT thread scheduler 130 accesses the first entry in the HRT thread table 120, providing an infinitely repeating sequence of HRT threads.

The HRT thread scheduler 130 and HRT thread table 120 also allow semi-flexible scheduling where a subset of processor resources, such as stages in the pipeline 110, are allocated for HRT threads and the remaining processor resources are allocated among NRT threads. Hence, semi-flexible scheduling allocates a subset of execution cycles for execution of HRT threads while the remaining execution cycles are used for NRT thread execution. For example, the HRT thread table 120 describes an execution schedule of "0***1" for threads HRT threads "0" and "1," where "*" indicates execution cycles where a NRT thread may be executed by the processor. In the example schedule described above, threads "0" and "1" have deterministic performance as they are allocated processor execution cycles at intervals specified by the HRT thread table 120.

While the HRT thread table 120 identifies execution cycles when HRT threads are executed, instructions from non-real time (NRT) threads may be executed during an execution cycle associated with a HRT thread if the HRT thread cannot be scheduled, or is idle, during its associated execution cycle. For example, in the example execution schedule described above, if thread "0" cannot be scheduled in its associated execution cycle, the associated execution cycle may be used to execute an NRT thread to most efficiently use processor resources.

Execution cycles which the HRT thread table 120 does not associate with a HRT thread or in which a HRT thread from the HRT thread table 120 is unable to be scheduled are used to execute NRT threads. A non-real time (NRT) thread table 140 allows asymmetric allocation of embedded processor resources, such as access to the pipeline 110, by associating NRT threads with execution cycles. Modifying the NRT table 140 allows customization of the execution bandwidth allocated to different NRT threads. Each entry in the NRT thread table 140 represents a processor execution cycle, and each entry of the NRT thread table 140 includes a thread identifier associating a NRT thread with an execution cycle in which the NRT thread is executed. In an embodiment, entries in the NRT thread table 140 also include a status indicator specifying whether the NRT thread identified by an entry in the NRT thread table 140 is valid. For example, the status indicator comprises a bit where a first value indicates the entry is valid and a second value indicates the entry is not valid. The NRT thread table 140 includes a predefined number of entries, such as 32 entries. Once the last entry in the NRT thread table 140 is reached, the NRT thread scheduler 150 again accesses the first entry in the NRT thread table 140, providing a continuous sequence of NRT threads for execution.

When the HRT thread scheduler 130 is unable to schedule a HRT thread from the HRT thread table 120 or the HRT thread table 120 does not identify a HRT thread, the NRT thread scheduler 150 advances to a subsequent entry of the NRT thread table 140. For example, during a processor execution cycle when a HRT thread cannot be scheduled or is not scheduled for execution, a first entry in the NRT thread table 140 is accessed. During the next processor execution cycle when an HRT thread cannot be scheduled or is not scheduled for execution, a next consecutive entry in the NRT thread table 140 is accessed. In an embodiment, the NRT thread table 140 is advanced to the next sequential entry during each processor execution cycle in which the HRT thread scheduler 130 does not schedule a HRT thread for execution, regardless of whether an NRT thread is scheduled using the NRT thread scheduler 150.

In addition to the HRT scheduler 130 and the NRT scheduler 150, the thread selection hardware 100 also includes a round-robin scheduler 160. In an embodiment, the HRT thread table 120 and the NRT thread table 140 include a subset of the threads scheduled by the thread selection hardware 100. To schedule the additional threads, the round-robin scheduler 160 distributes processor resources, such as access to the pipeline 110, between the additional threads. The round-robin scheduler 160 includes thread identifiers associated with each NRT thread in the NRT thread table 140 as well as thread identifiers associated with additional NRT threads. In an embodiment, the round-robin scheduler 160 comprises a priority encoder which assigns lowest priority to the most recent thread scheduled by the round-robin scheduler 160, allowing different threads to be scheduled by the round-robin scheduler 160 during different execution cycles. However, the round-robin scheduler 160 does not modify the priority level associated with threads scheduled by the HRT thread scheduler 130 or the NRT thread scheduler 150 when assigning priority to different threads.

In an embodiment, the HRT thread scheduler 130, the NRT thread scheduler 150 and the round-robin scheduler 160 are coupled to a thread selector 170 which uses pointers from the HRT thread scheduler 130 or the NWT thread scheduler 150 to retrieve instructions from the memory 180 for communication to the pipeline 110. For example, each HRT thread and NRT thread is associated with an independent program counter including information describing the thread and an address in the memory 180 from which an instruction from the thread is retrieved. For example, when an HRT thread is to be executed, the program counter associated with the HRT thread identifies the memory address from which the thread selector 170 obtains an instruction from the HRT thread for communication to the pipeline 110. Similarly, when an NRT thread included in the NRT table 140 is to be executed, the thread selector 170 retrieves an instruction of the NRT thread identified from a memory address identified by a program counter associated with the NRT thread.

System Operation

Figure 2:
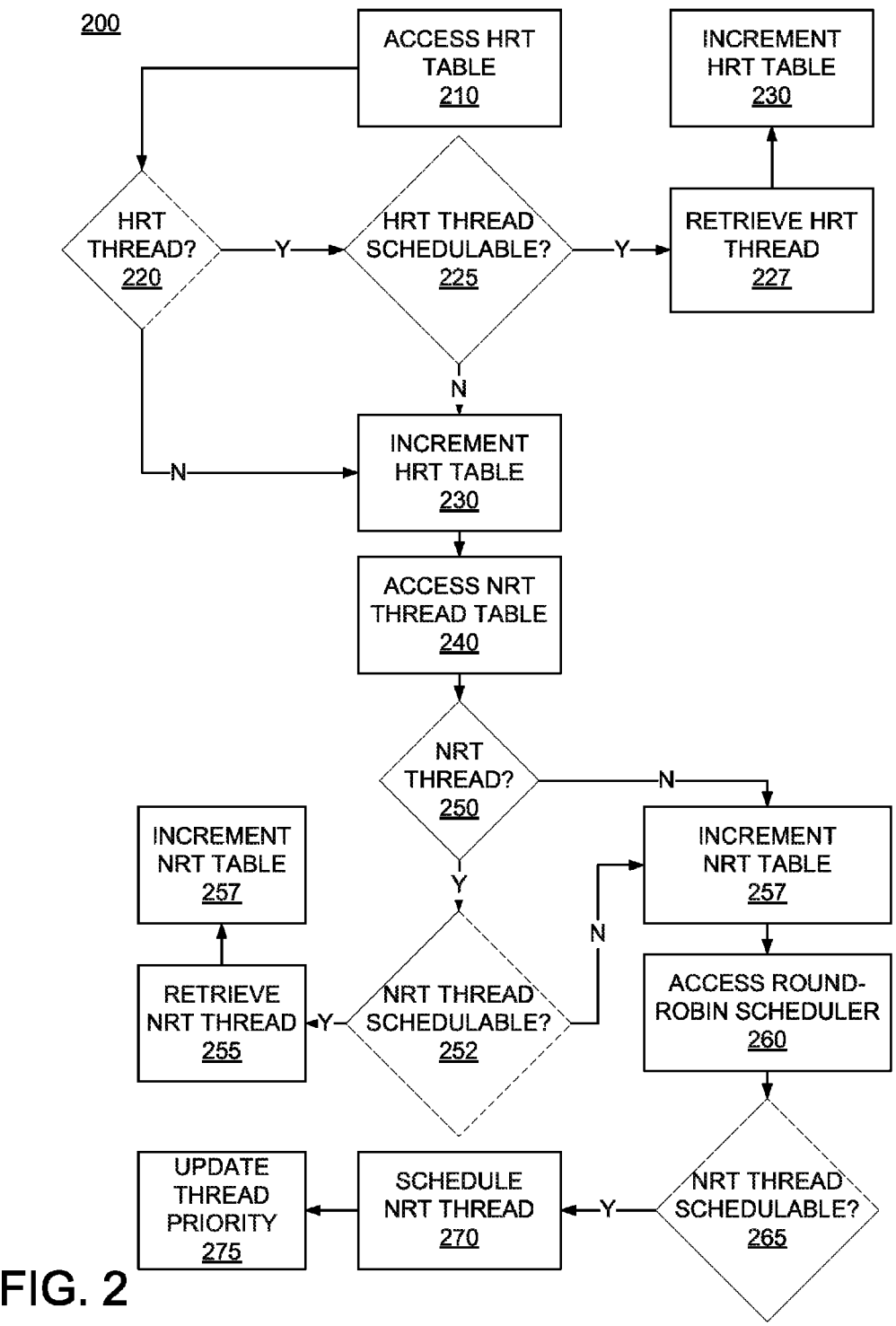
FIG. 2 is a flow chart of a method for allocating processor resources between threads according to one embodiment of the present invention.

FIG. 2 is a flow chart of a method 200 for allocating processor resources between threads according to one embodiment of the present invention. Those of skill in the art will recognize that other embodiments can perform the steps of FIG. 2 in different orders. Moreover, other embodiments can include different and/or additional steps than the ones described here. In an embodiment, steps depicted in the method 200 shown in FIG. 2 are implemented by instructions for performing the described actions are embodied or stored within a computer readable storage medium, such as a memory, that are executable by a processor. Those of skill in the art will recognize that the steps of the method 200 may be implemented in embodiments of hardware and/or software or combinations thereof and additional embodiments can include different and/or additional states or state transitions than the ones shown in FIG. 2.

During an execution cycle, the HRT thread scheduler 130, the NRT thread scheduler 150 and the round-robin scheduler 160 identify a thread from which instructions are communicated to the pipeline 110. Initially, the HRT thread scheduler 130 accesses 210 a HRT thread table 120 and determines 220 whether the HRT thread table 120 includes a HRT thread identifier, such as a HRT thread number, associated with an execution cycle. Responsive to determining 220 that the HRT thread table 120 includes a HRT thread identifier associated with the execution cycle, the HRT thread scheduler 130 determines 225 whether an instruction from the HRT thread identifier included in the HRT thread table 120 is able to be scheduled during the execution cycle. For example, the HRT thread scheduler 130 determines 225 whether an identified HRT thread has been put into a suspended state or is able to run. A HRT thread may be put into a suspended state by software, such as when waiting for an interrupt, or may be put into a suspended stated by hardware, such as when waiting for a cache miss to be serviced or when waiting for a slow input/output. When the identified HRT thread is in a suspended state, the HRT thread is unable to be scheduled. If the HRT thread scheduler 130 determines 225 that an instruction from an identified HRT thread is able to be scheduled, the thread selector 170 retrieves 227 the identified instruction from the identified HRT thread from the memory 180 and inserts the identified instruction in the pipeline 110 for execution. After retrieving 227 the HRT thread instruction, the HRT thread scheduler 130 is incremented 230 to access a different entry. For example, the HRT thread scheduler 130 is incremented 230 to access the next consecutive entry in the HRT thread table 120.

Responsive to determining 220 that the HRT thread table 120 does not include a HRT thread identifier associated with an execution cycle, the HRT thread scheduler 120 is incremented 230 to accesses a different entry. For example, the HRT thread scheduler 130 is incremented 230 to access the next consecutive entry in the HRT thread table 120.

Incrementing 230 the HRT thread scheduler 130 causes the HRT associated with the HRT thread identifier included in the next entry in the HRT thread table 120 to be accessed during the subsequent execution cycle. For example, if the HRT thread table 120 includes an execution schedule of "0121," when the HRT thread scheduler 130 initially accesses 210 the HRT thread table 120, HRT thread "0" is identified. After identifying HRT thread "0" and determining 220 that an instruction from HRT thread "0" is able to be scheduled, the HRT thread scheduler 130 is incremented 230 so that when the HRT thread table 120 is next accessed 310, HRT thread "1" is identified.

However, if the HRT thread scheduler 130 determines 220 that an instruction from the identified HRT thread cannot be scheduled during the execution cycle, the HRT thread scheduler 130 is incremented 230 to access the next entry in the HRT thread table 120 and the NRT thread table 140 is accessed 240 by the NRT thread scheduler 150 to identify an NRT thread identifier, such as an NRT thread number. Similar to the HRT thread table 120, after accessing 240 the NRT thread table 140 and additional processing the NRT thread scheduler 150 is incremented 257 so that that an NRT thread identifier included in a different entry of the NRT thread table 140 is accessed when the NRT thread table 140 is next accessed 240. For example if the NRT thread table 140 includes an execution schedule of "435," initially accessing 240 the NRT thread table 140 identifies NRT thread "4" and increments 257 the NRT thread scheduler 150 so that NRT thread "3" is identified when the NRT thread table 140 is next accessed 240. The NRT thread scheduler 150 is incremented 257 to access the next element in the NRT thread table 140 each time the NRT thread table 140 is accessed 240, even if the NRT thread scheduler 150 determines 250 that the NRT thread table 140 does not include an NRT thread identifier or determines 252 that an instruction from an identified NRT thread is unable to be scheduled for execution during the current execution cycle.

After accessing 240 the NRT thread table 140, the NRT thread scheduler 150 determines 252 whether the NRT thread table 140 includes a NRT thread identifier, such as a NRT thread number, associated with an execution cycle. Responsive to determining 252 that the NRT thread table 140 includes a NRT thread identifier associated with the execution cycle, the NRT thread scheduler 150 determines 252 whether an instruction from the NRT thread identifier included in the NRT thread table 140 is able to be scheduled during the execution cycle. For example, the NRT thread scheduler 150 determines 252 whether data or memory resources used by the NRT thread are currently in use or are currently available.

Alternatively, the NRT thread scheduler 150 determines 252 whether resources, such as an input device or an output device, used by the identified NRT thread are accessible during the execution cycle. For example, the NRT thread scheduler 150 determines 252 whether an identified NRT thread has been put into a suspended state or is able to run. A NRT thread may be put into a suspended state by software, such as when waiting for an interrupt, or may be put into a suspended stated by hardware, such as when waiting for a cache miss to be serviced or when waiting for a slow input/output. When the identified NRT thread is in a suspended state, the NRT thread is unable to be scheduled. Responsive to determining 252 that an instruction from the identified NRT is able to be scheduled for execution during the instruction cycle, the thread selector 170 retrieves 255 the instruction from the memory 180 and includes the instruction in the pipeline 110 for execution.

If the NRT thread scheduler 150 determines 252 that an instruction from the identified NRT thread cannot be scheduled during the execution cycle, the thread selector 170 accesses 260 the round-robin scheduler 160 to identify a NRT thread to schedule 270 for execution. The round-robin scheduler 160 rotates through each NRT thread, allowing retrieval and execution of instructions from different active NRT threads during different execution cycles, distributing execution cycles between multiple NRT threads to allow scheduling of NRT threads not included in the NRT thread table 140.

In one embodiment, the round-robin scheduler 160 assigns a priority level to each NRT thread, including the NRT threads identified by the NRT thread table 140, and modifies the priority level associated with the NRT threads as the round-robin scheduler 160 is used to schedule 270 a NRT thread for execution. For example, the round-robin scheduler 160 assigns a lowest priority to the NRT thread most recently scheduled 270 for execution by the round-robin scheduler 160, so that a subsequent use of the round-robin scheduler 160 schedules 270 a different NRT thread. However, in an embodiment, the round-robin scheduler 160 does not modify priority levels of threads when threads are scheduled by the NRT thread scheduler 150 or the HRT thread scheduler 130.

After identifying a NRT thread, the round-robin scheduler determines 265 whether an instruction from the identified NRT thread is able to be scheduled for execution during the current execution cycle. For example, the round-robin scheduler 160 determines 265 whether an instruction from the highest-priority NRT thread is able to be scheduled. If an instruction from the NRT thread identified by the round-robin scheduler 160 is able to be scheduled, the identified NRT thread is scheduled 270 for execution and the priority level associated with the scheduled NRT thread is updated 275. For example, after scheduling 270 an NRT thread for execution, the round-robin scheduler 160 updates 275 the priority level so that the NRT thread which was scheduled 270 has a lowest priority level.

However, if an instruction from the NRT thread is unable to be scheduled, the round-robin scheduler 160 identifies an NRT thread having a next-highest priority level and determines 265 whether an instruction from the NRT thread having the next-highest priority level is able to be scheduled and schedules 270 the NRT thread having the next-highest priority level for execution. The round-robin scheduler 160 then updates 270 the priority level so that the NRT thread which was scheduled 270 has the lowest priority level. Hence, if the highest priority NRT thread is unable to be scheduled, it is skipped and its priority level is updated 275, so that a subsequent access 260 to the round-robin scheduler 160 initially determines 265 whether a thread from the highest priority NRT thread is able to be scheduled. In certain operating scenarios, if the round-robin scheduler 160 is unable to determine 265 a thread including an instruction that may be scheduled, no thread may be scheduled. For example, if each NRT thread included in the round-robin 160 scheduler is waiting for an interrupt or a cache miss, the method 220 would not schedule 270 a NRT thread for execution.

Examples of operation of the method 200 for processor resource allocation are further described below in conjunction with FIG. 2 and FIGS. 3A-3D.

Example Operation

The example thread schedules and HRT thread table 120 and NRT thread table 140 depicted in FIGS. 3A-3D are shown to illustrate operation of the method 200 for processor resource allocation in various example scenarios. The examples of FIGS. 3A-3D are presented for clarity and represent example implementations, while additional or different implementations are also possible.

Figure 3A:
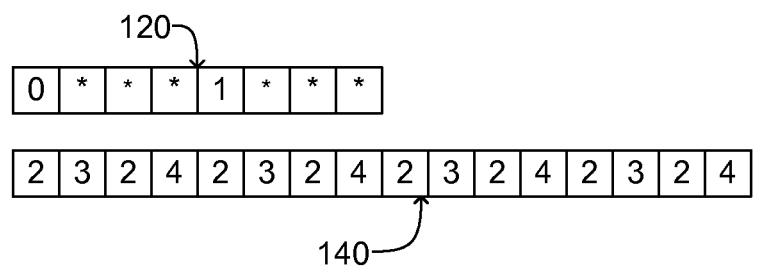
FIG. 3A is an example of a hard real time thread table and a non-real time thread table according to one embodiment of the present invention.
Figure 3B:
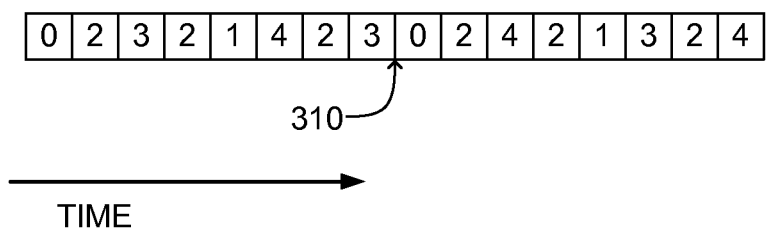
FIG. 3B is an example thread execution schedule generated from a hard real time thread table and a non-real time thread table with no thread scheduling constraints according to one embodiment of the present invention.
Figure 3C:
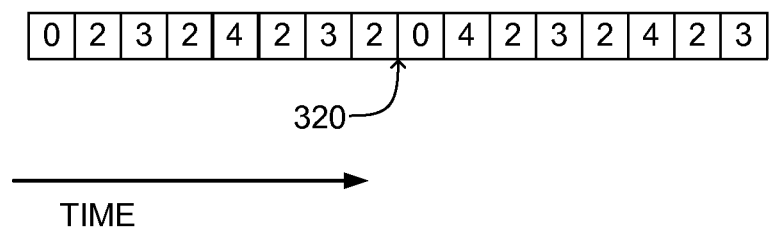
FIG. 3C is an example thread execution schedule generated from a hard real time thread table and a non-real time thread table when a hard real time thread is unable to be scheduled according to one embodiment of the present invention.
Figure 3D:
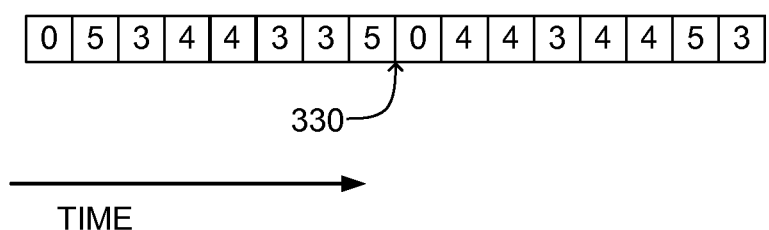
FIG. 3D is an example thread execution schedule generated from a hard real time thread table and a non-real time thread table when a hard real time thread and a non-real time thread are unable to be scheduled according to one embodiment of the present invention.

FIG. 3A shows an example HRT thread table 120 and an example NRT thread table 140 which are used with the thread scheduling method 200 to produce the example thread schedules shown in FIGS. 3B-3D. For purposes of illustration, the example HRT thread table 120 identifies two HRT threads, thread "0" and thread "1." In FIG. 3A, entries in the HRT thread table 120 denoted by a "*" represent execution cycles where no specific HRT thread is scheduled for execution, allowing execution of an NRT thread during these execution cycles. Additionally, for purposes of illustration, FIG. 3A depicts eight entries in the HRT thread table 120; however, in other embodiments the HRT thread table 120 may include a different number of entries. When the last entry in the HRT thread table 120 is reached, the first entry in the HRT thread table 120 is again accessed, providing an infinite sequence of HRT threads for execution. Hence, when the rightmost entry of the example HRT thread table 120 in FIG. 3A, which includes a "*," is accessed, the leftmost entry of the example HRT thread table 120 in FIG. 3A, which includes a "0," is accessed when the HRT thread table 120 is again accessed.

The example NRT thread table 140 shown in FIG. 3A includes sixteen entries identifying NRT thread numbers for execution. However, in other embodiments, the NRT thread table 140 includes a greater or fewer number of entries. For example, in another embodiment, the NRT thread table 140 has 32 entries. The example NRT thread table 140 in FIG. 3A identifies three NRT threads, thread "2," thread "3" and thread "4." Similar to the HRT thread table 120, when the last entry of the NRT thread table 140 is reached, the first entry of the NRT thread table 140 is again accessed, providing a repeating sequence of NRT threads for execution. So, after the rightmost entry of the example NRT thread table 140 in FIG. 3A, which includes a "4," is accessed, the next access to the example NRT thread table 140 in FIG. 3A identifies the leftmost entry of the example NRT thread table 140 in FIG. 3A, which includes a "2."

Using the example HRT thread table 120 and example NRT thread table 140 shown in FIG. 3A, FIGS. 3B-3D provide examples of thread execution schedules 310, 320, 330 produced by the thread scheduling method 200 implemented by the thread scheduling hardware 100 when different example scenarios are encountered. In FIG. 3B, threads "0" through "4" are each able to be scheduled, so the method 200 results in thread execution schedule 310. During the first execution cycle the HRT thread table 120 is initially accessed 210 by the HRT thread scheduler 120 which determines 220 that the HRT thread table 120 identifies and thread "0." After determining 225 that an instruction from thread "0" is able to be scheduled during the first execution cycle, the thread selector 170 retrieves 227 an instruction from thread "0" which is inserted into the pipeline 110 for execution. The HRT thread scheduler 130 is then incremented 230 so that the next entry in the HRT thread table 120 is accessed during the next execution cycle. In the example of FIG. 3B, the HRT thread scheduler 130 is incremented 230 so the second entry in the HRT thread table 120 is accessed.

In the second execution cycle, the second entry in the HRT thread table 120 is accessed 210 by the HRT thread scheduler 130. Because the second entry in the HRT thread table 120 does not identify a specific HRT thread, the HRT thread scheduler 130 determines 220 that no HRT thread is identified. The HRT thread scheduler 130 is then incremented 230 to access the next entry in the HRT thread table 120 and the NRT thread scheduler 150 accesses 240 the NRT thread table 140.

The NRT thread scheduler 150 determines 250 that the first entry in the NRT thread table 140 identifies thread "2," and the NRT thread scheduler also 140 determines 252 that thread "2" is able to be scheduled. Hence, the thread selector 170 retrieves 255 an instruction from thread "2" and places the retrieved instruction into the pipeline 110 for execution. The NRT thread scheduler 150 is then incremented 257 to access the second entry in the NRT thread table 140.

During the third execution cycle, the third entry in the HRT thread table 120 is initially accessed 210 by the HRT thread scheduler 130. After determining 220 that no HRT thread is scheduled for execution by the HRT thread table 120, the HRT thread scheduler 130 is incremented 230 to access the next entry in the HRT thread table 120. The NRT thread scheduler 150 then accesses 240 the NRT thread table 140 and determines 250, 252 that the NRT thread table 140 identifies a NRT thread and that an instruction from the NRT thread is able to be scheduled for execution. The thread scheduler 170 then retrieves 255 an instruction from thread "3" and inserts the instruction into the pipeline 110. The NRT thread scheduler 150 is then incremented 257 after retrieving 255 an instruction from thread "3."

During the next execution cycle, the fourth entry in the HRT thread table 120 is accessed 210 by the HRT thread scheduler 130, which determines 220 that no HRT thread is identified by the HRT thread table 120. The HRT thread scheduler 130 is then incremented 230 to access the fourth entry in the HRT thread table and the NRT thread scheduler 150 accesses 240 the third entry in the NRT thread table 140. The NRT thread scheduler 130 determines 250 that the third entry in the thread table 140 identifies a NRT thread, thread "2." The NRT thread scheduler 150 then determines 252 that an instruction from thread "2" is able to be scheduled and retrieves 255 an instruction from thread "2," which is placed in the pipeline 110 for execution. The NRT thread schedule 150 is then incremented 257 to access the fourth entry in the NRT thread table 140.

In the fifth execution cycle, the HRT thread scheduler 130 accesses 210 the fifth entry in HRT thread table 120, and determines 220 is identified by the HRT thread scheduler 130.

After determining 225 that an instruction from thread "1" is able to be scheduled, the thread selector 170 retrieves 227 an instruction from thread "1" for insertion into the pipeline 110. After placing the instruction from thread "1" into the pipeline, the HRT thread scheduler 130 is incremented 230 to access the sixth entry of the HRT thread schedule 120. The NRT scheduler 150 is not incremented as it was not used to access the NRT thread scheduler during this instruction cycle.

In the sixth execution cycle, the sixth entry in the HRT thread table 120 is accessed 210 by the HRT thread scheduler 130, which determines 220 that that no HRT thread is scheduled for executions by the sixth entry in the HRT thread table 120. The HRT thread scheduler 130 is incremented 230 to access the seventh entry in the HRT thread table 120 and the NRT thread scheduler 150 accesses 240 the fourth entry in the NRT table 140. The NRT thread scheduler 150 determines 250 that the fourth entry in the NRT table 140 identifies thread "4" and determines 252 that an instruction from thread "4" is able to be scheduled. An instruction from thread "4" is then retrieved 255 by the thread selector 170 and placed in the pipeline 110 for execution. The NRT thread scheduler 150 is incremented 257 to access the fifth entry in the NRT thread table 140.

During subsequent execution cycles, the HRT thread table 120 and NRT thread table 140 are accessed 210 as described above to complete the thread execution schedule 310. Hence, in subsequent execution cycles, the HRT thread table 120 is initially accessed 210 by the HRT thread scheduler 130 to determine 220 whether a HRT thread is identified by the HRT thread table 120 and to determine 225 whether an instruction form a HRT thread identified by the HRT thread table 120 is able to be scheduled during an execution cycle. If the HRT thread scheduler 130 determines 220 that the HRT thread table 120 does not include an entry identifying an HRT thread, the NRT thread table 140 is accessed 240 by the NRT thread scheduler 150 to determine 250 whether the NRT thread table 140 identifies an NRT thread and to determine 252 whether an instruction from an identified NRT thread is able to be scheduled during the execution cycle. Thus, the HRT thread scheduler 130 is incremented 230 after being accessed 210 in each execution cycle and the NRT thread scheduler 150 is similarly incremented 257 each time the NRT thread scheduler 130 does not schedule a thread and the NRT thread table 240 is accessed. However, the NRT thread scheduler 150 is not incremented 257 when an instruction from a HRT thread is retrieved 227 for execution. Hence, the NRT thread scheduler 150 is incremented 257 each time it is used to access 240 the NRT thread table 140 rather than each execution cycle.

However, in certain scenarios, threads included in the HRT thread table 120 or NRT thread table 140 may not be schedulable during certain execution cycles. When threads included in the HRT thread table 120 are unable to be scheduled during an execution cycle, the NRT thread table 140 is accessed to determine a thread for execution during the execution cycle. FIG. 3C shows generation of an example thread schedule 320 when a thread identified by the HRT thread 120 table is unable to be scheduled. In the example scenario shown in FIG. 3C, instructions from thread "1" are unable to be scheduled.

The example thread schedule 320 shown in FIG. 3C is generated by the HRT thread scheduler 130 and NRT thread scheduler 150 respectively accessing the HRT thread table 120 and the NRT thread table 150 as described above with respect to FIG. 3B until the fifth execution cycle, when HRT thread scheduler 130 accesses 210 the fifth entry in the HRT table 120. In the example scenario described in conjunction with FIG. 3C, instructions from thread "1" are unable to be scheduled. Thus, after determining 220 that the fifth entry of HRT thread table 120 identifies thread "1," the HRT thread scheduler 130 determines 225 that an instruction from thread "1" is unable to be scheduled for execution during the fifth execution cycle, so the HRT thread scheduler 130 is incremented 230 to access the sixth entry in the HRT thread table 120 and the NRT thread scheduler 150 accesses 240 the NRT thread table 130.

During the first four execution cycles in the example of FIG. 3B, the NRT thread scheduler 150 has been incremented during the three instruction cycles when a thread from the NRT thread table 120 was retrieved 255 and scheduled for execution. Hence, in the fifth instruction cycle, the NRT thread scheduler 140 accesses the fourth entry in the NRT thread table 140 and determines 250 that thread "4" is identified. The NRT thread scheduler 150 then determines 252 whether thread "4" is able to be scheduled during the current execution cycle. Responsive to the NRT thread scheduler 150 determining 252 that thread "4" is able to be scheduled, the thread selector 170 retrieves 255 an instruction from thread "4" and inserts the retrieved instruction to the pipeline 110 for execution. The NRT thread scheduler 150 is subsequently incremented 257 to access the fifth entry in the NRT thread table 140.

Hence, when a HRT thread identified by the HRT thread table 120 is unable to be scheduled during an execution cycle, the HRT thread schedule 130 is incremented 230 to access a different entry in the HRT thread table 120 and the NRT thread table 140 is accessed 240 to identify an NRT thread that is attempted to be scheduled during the execution cycle. Hence, the method 200 allows threads identified by the HRT thread table 120 to have the highest priority for execution using the pipeline 110 and threads identified by the NRT thread table 140 to have the second-highest priority for execution using the pipeline 110.

However, in an alternative scenario shown by FIG. 3D, one or more threads from both the HRT thread table 120 and the NRT thread table 140 are unable to be scheduled in an execution cycle. FIG. 3D shows an example thread execution schedule 330 generated when an HRT thread, thread "1" and an NRT thread, thread "2" are unable to be scheduled. When neither the HRT thread table 120 nor the NRT thread table 140 identifies a thread able to be executed in an execution cycle, a round-robin scheduler 160 identifies an NRT thread to be scheduled 260 during the execution cycle. In FIG. 3D, thread "5" represents an NRT thread not included in the NRT thread table 140, but included in the round-robin scheduler 160. In the example of FIG. 3D, the round-robin scheduler 160 initially associates thread "5" with a highest priority level and initially associates thread "3" with a lowest priority level. However, this is merely an example selected for purposes of illustration, and in other scenarios the round-robin scheduler associates the highest priority level and the lowest priority level with different threads. The round robin scheduler 160 includes thread identifiers associated with each NRT thread that may be scheduled, including NRT threads included in the NRT thread table 140 and NRT threads not included in the NRT thread table 140.

In the example thread execution schedule 330 shown in FIG. 3D, during the first execution cycle, the HRT thread scheduler 130 accesses 210 the HRT thread schedule 120 and determines 220 that the first entry in the HRT thread table identifies thread "0." After the HRT thread scheduler 130 determines 225 that thread "0" may be scheduled during the first execution cycle, the thread selector 170 retrieves 227 an instruction from thread "0" and communicates the retrieved instruction to the pipeline 110. The HRT thread scheduler 130 is then incremented 230 to access the second entry in the HRT thread table 120.

During the second execution cycle, the HRT thread scheduler 130 accesses 210 the HRT thread table 120 and determines 220 that the second entry of the HRT thread table 120 does not identify a HRT thread. Thus, the HRT thread scheduler 130 is incremented 230 to access the third entry in the HRT thread table 120 and the NRT thread scheduler 150 accesses 240 the first entry in NRT thread table 140. From the first entry in the NRT thread table 140, the NRT thread scheduler 150 determines 250 that the NRT thread table 140 identifies thread "2." However, the NRT thread scheduler 150 determines 252 that thread "2" is unable to be scheduled, so the NRT thread scheduler 150 is incremented 257 to access the second entry in the NRT thread table 140 and the round-robin scheduler 160 schedules 260 a NRT thread for execution during the second execution cycle. As illustrated in this example, the NRT thread scheduler 150 is incremented 257 each time the NRT thread scheduler 150 accesses 240 the NRT thread table 140, even if the NRT thread scheduler 150 determines 252 that an NRT thread identified by the NRT thread table is ultimately unable to be scheduled during the current execution cycle.

The round-robin scheduler 160 includes thread identifiers for each NRT thread capable of being executed by the pipeline 110 and associates a priority level with each thread identifier. Thus, the round-robin scheduler 160 is capable of scheduling all NRT threads which are able to run, allowing the round-robin schedule 160 to identify threads for execution from a pool of NRT threads that is greater than or equal to the number of threads included in the NRT thread table 130. The priority level determines which thread is scheduled by the round-robin scheduler 160. In the example shown in FIG. 3D, the round-robin scheduler 160 includes thread identifiers "2," "3" and "4," which are included in the NRT thread table 140, as well as thread identifier "5." However, because FIG. 3D depicts a scenario where thread "2" is unable to be scheduled and the round-robin scheduler 160 also identifies threads unable to be scheduled, the round-robin scheduler 160 identifies which of threads "3," "4" and "5" are to be scheduled 260 in an execution cycle.

In the example of FIG. 3D, the round-robin scheduler 160 initially associates the highest priority level with thread "5," which is not included in the NRT thread table 150. Accordingly, when the NRT thread scheduler 150 is unable to schedule thread "2" during the second execution cycle, the round-robin scheduler 160 schedules 260 the thread identifier associated with the highest priority level, thread "5," for execution, so the thread selector 170 retrieves an instruction from thread "5" for execution by the pipeline 110. However, in other implementations, the round-robin scheduler 160 may initially associate the highest priority level with a different thread, even a thread included in the NRT thread table 140.

After an instruction from thread "5" is included in the pipeline 110, the round-robin scheduler 160 modifies the priority levels associated with the NRT threads. In one embodiment, the round-robin scheduler 160 assigns the lowest priority level to the thread most recently scheduled by the round-robin scheduler 160. Hence, in the example of FIG. 3D, after the round-robin scheduler 160 schedules 260 thread "5," the lowest priority level is associated with thread "5." In an embodiment, the round-robin scheduler 160 may also modify the priority level of other threads to rotate the order in which threads are allocated execution cycles.

During the third execution cycle, the HRT thread scheduler 130 accesses 210 the HRT thread table 120 and determines 220 that no HRT thread is identified by the third entry of the HRT thread table 120. Thus, the HRT thread scheduler 130 is incremented 230 to access the fourth entry in the HRT thread table 120 And the NRT thread scheduler 150 accesses 240 the second entry in the NRT thread table 140. From the second entry in the NRT thread table, the NRT thread scheduler 150 determines 250 thread "3" is identified. After determining 252 that thread "3" is able to be scheduled during the third execution cycle, the thread selector 170 retrieves 255 an instruction from thread "3" for execution by the pipeline 110 and the NRT thread scheduler 150 is incremented 257 to access the third entry in the NRT thread table 140. In the example of FIG. 3D, because thread "3" is scheduled by using the NRT thread table 120, the round-robin scheduler 160 does not modify the priority level associated with thread "3." The priority level associated with the threads by the round-robin scheduler 160 is modified when the round-robin scheduler 160 is used to schedule a thread, and is not altered when the HRT thread scheduler 130 or NRT thread scheduler 150 schedules a thread.

In the fourth execution cycle, the HRT thread scheduler 130 accesses 210 the fourth entry of the HRT thread table 120 and determines 220 that the HRT thread table 120 does not identify a HRT thread for execution, so the HRT thread scheduler 130 is incremented 257 to access the fifth entry in the HRT thread table 120. The NRT thread scheduler 150 then accesses 240 the third entry in the NRT thread table 140 to determine 250 that thread "2" is to be scheduled. However, the NRT thread scheduler 150 also determines 252 that thread "2" is unable to be scheduled during the fourth execution cycle, so the NRT thread scheduler 150 is incremented 257 to access the fourth entry of the NRT thread table 140 and the round-robin scheduler 160 schedules 260 an NRT thread for execution.

In the example of FIG. 3D, after thread "5" was previously scheduled by the round-robin scheduler 170, thread "5" is associated with the lowest priority level by the round-robin scheduler 170. Hence, in the example of FIG. 3D, thread "4" is currently associated with the highest priority by the round-robin scheduler 160. Therefore, the round-robin scheduler 170 schedules 260 thread "4" for execution and the thread selector 170 communicates an instruction from thread "4" to the pipeline 110. The round-robin scheduler 160 then associates the lowest priority with thread "4," as is now the thread most recently scheduled by the round-robin scheduler 160, and increases the priority associated with thread "5."

In the fifth execution cycle, the HRT thread scheduler 130 accesses 210 the HRT thread table 120 and determines 220 that the fifth entry in the HRT thread table 120 identifies thread "1." However, in the example of FIG. 3D, the HRT thread scheduler 130 determines 225 that thread "1" is unable to be scheduled. Hence, the HRT thread scheduler 130 is incremented 230 to access the sixth entry in the HRT thread table 120 and the NRT thread scheduler 150 accesses 240 the fourth entry of the NRT thread table 140 to determine 250 that thread "4" is identified for execution. After determining 252 that thread "4" is schedulable, the thread selector 170 retrieves 255 an instruction from thread "4" that is communicated to the pipeline 110 and the NRT thread selector 130 is incremented 257 to access the fifth entry of the NRT thread table 140.

During the sixth execution cycle, accessing 210 the sixth HRT thread table 120 causes the HRT thread scheduler 130 to determine 220 that no HRT thread is scheduled for execution. Thus, so the HRT thread scheduler 130 is incremented 230 to access the sixth entry in the HRT thread table 120 and the NRT thread scheduler 130 accesses 240 the fifth entry of the NRT thread table 140. From the NRT thread table 140, the NRT thread scheduler 130 determines 250 that thread "2" is scheduled for execution. In the scenario shown in FIG. 3D, the NRT thread scheduler 150 then determines 252 that thread "2" is unable to be scheduled, so the NRT thread scheduler 150 is incremented 257 to access the sixth entry of the NRT thread table 140 without the thread selector 170 retrieving 255 an instruction from thread "2."

Because thread "2" cannot be scheduled by the NRT thread scheduler 150, the round-robin scheduler 160 is again used to schedule 260 a thread for execution. In the example of FIG. 3D, after thread "4" was previously scheduled and associated with the lowest priority level by the round-robin scheduler 160, thread "3" is associated with the highest priority. Therefore, the round-robin scheduler 160 schedules 260 schedules thread "3" for execution and the thread selector 170 retrieves an instruction from thread "3" that is communicated to the pipeline 110. After an instruction from thread "3" is communicated to the pipeline 110, the round-robin scheduler 160 modifies the priorities associated with various threads so that the lowest priority is associated with thread "3," as it is the thread most recently scheduled by the round-robin scheduler 160.

During the seventh execution cycle, the HRT thread scheduler 130 accesses 210 the seventh entry in the HRT thread table 120 and determines 220 that the HRT thread table does not identify a HRT thread for execution. The HRT thread scheduler 130 is incremented 230 to access the eighth entry in the HRT thread table 120 and the NRT thread scheduler 130 accesses 240 the sixth entry of the NRT thread table 140. From the NRT thread table 140, the NRT thread scheduler 130 determines 250 that thread "3" is scheduled for execution. After the NRT thread scheduler 150 determines 252 thread "3" is able to be scheduled, the thread selector 170 retrieves 255 an instruction from thread "3" that is communicated to the pipeline 110 and the NRT thread selector 150 is incremented 257 to access the seventh entry of the NRT thread table 140.

Threads associated with remaining execution cycles shown in the thread schedule 330 of FIG. 3D are determined by accessing 210, 240 the HRT thread table 120, the NRT thread table 140 and the round-robin scheduler 160 as described above. Hence, the HRT thread table 120 is initially accessed 210 to determine 220 whether a HRT thread is identified for scheduling during an execution cycle and to determines 225 whether an instruction form an identified HRT thread is able to be scheduled in the execution cycle. If the HRT thread table 120 does not include an entry for an HRT thread or the identified HRT thread is unable to be scheduled, the NRT thread table 140 is accessed 240 to determine 250 whether a NRT thread is identified and to determine 252 whether an identified NRT thread is able to be executed in an instruction cycle. If the NRT thread table 140 does not identify an NRT thread or the NRT thread scheduler 150 determines 252 the identified NRT thread is unable to be scheduled, the round-robin scheduler 160 is used to schedule 260 a NRT thread for execution. NRT thread selection by the round-robin scheduler 160 is independent from NRT thread selection from the NRT thread table 140, so scheduling of an NRT thread by the NRT thread table 140 does not affect the priority associated with NRT threads by the round-robin scheduler 160.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. An embedded processor comprising:
   a memory storing a plurality of hard real time (HRT) threads and a plurality of non-real time (NRT) threads, each HRT thread and each NRT thread including a corresponding plurality of instructions, wherein each HRT thread includes a corresponding HRT thread identifier (ID) and each NRT thread includes a corresponding NRT thread ID;
   a HRT thread table specifying a temporal order in which processing time is allocated to the HRT threads, wherein the HRT thread table comprises a plurality of entries, each entry corresponding to an execution cycle and associated with one of the HRT thread IDs;
   a HRT thread scheduler coupled to the HRT thread table, the HRT thread scheduler configured to, for each execution cycle, access the HRT thread table to retrieve the HRT thread ID associated with the HRT thread table entry corresponding to the execution cycle and to determine whether one or more resources are available to a particular HRT thread identified by the retrieved HRT thread ID;
   a NRT thread table comprising a sequential list of one or more of the NRT thread IDs, wherein the NRT threads corresponding to the NRT thread IDs are allocated processing time unused by a HRT thread in the order defined by the sequential list;
   a NRT thread scheduler coupled to the NRT thread table, the NRT thread scheduler configured to, in response to the HRT thread scheduler determining that the one or more resources are not available to the particular HRT thread for the execution cycle, access the NRT thread table to retrieve the NRT thread ID at a current position in the sequential list and to determine whether the one or more resources are available to a first NRT thread identified by the retrieved NRT thread ID;
   a round-robin scheduler coupled to the thread selector and to the memory, the round-robin scheduler configured to, in response to the NRT thread scheduler determining that the one or more resources are not available to the first NRT thread, identify a schedulable NRT thread from the plurality of NRT threads; and
   a thread selector coupled to the HRT thread scheduler, the NRT thread scheduler, and the memory, the thread selector configured to, for each execution cycle:
   retrieve from the memory an instruction of the particular HRT thread in response to the HRT thread scheduler determining that the one or more resources are available to the particular HRT thread for the execution cycle;
   retrieve from the memory an instruction of the first NRT thread identified by the NRT thread ID retrieved in response to the HRT thread scheduler determining that the one or more resources are not available to the particular HRT thread for the execution cycle, in response to the NRT thread scheduler determining that the one or more resources are available to the first NRT thread for the execution cycle; and
   retrieve from the memory an instruction of the schedulable NRT thread in response to the round-robin scheduler identifying the schedulable NRT thread.

2. The embedded processor of claim 1, wherein the round-robin scheduler is further configured to:
   associate a priority level with each NRT thread of the plurality of NRT threads, wherein the schedulable NRT thread is the NRT thread of the plurality of NRT threads having a highest priority level of the plurality of NRT threads for which the one or more resources are available.

3. The embedded processor of claim 2, wherein the round-robin scheduler is further configured to associate a lowest priority level with the schedulable NRT thread in response to the thread selector retrieving the instruction of the schedulable NRT thread from the memory.

4. The embedded processor of claim 3, wherein the round-robin scheduler is further configured to refrain from modifying the priority level associated with the first NRT in thread in response to the thread selector retrieving the instruction of the first NRT thread from the memory.

5. The embedded processor of claim 1, further comprising:
a pipeline coupled to the thread selector, the pipeline configured to execute the instruction retrieved from memory by the thread selector in one of a plurality of stages each execution cycle.

6. The embedded processor of claim 1, wherein the NRT thread table includes a status indicator associated with each of the one or more NRT thread identifiers.

7. A method for selecting a scheduled thread from among a plurality of hard real time (HRT) threads and a plurality of non-real time (NRT) threads, the scheduled thread to be allocated processor resources for a current execution cycle of a plurality of execution cycles, the method comprising:
accessing a HRT thread table specifying a temporal order in which processing time is allocated to the HRT threads, wherein the HRT thread table comprises a plurality of entries, each entry corresponding to an execution cycle of the plurality of execution cycles and identifying one of the HRT threads;
determining whether a particular HRT thread identified by the entry corresponding to the current execution cycle is able to be executed during the current execution cycle, and selecting the particular HRT thread as the scheduled thread when it is able to be executed;
in response to determining that the particular HRT thread is unable to be executed during the current execution cycle, accessing a NRT thread table comprising a sequential list of one or more entries each identifying one of the NRT threads, wherein the identified NRT threads are allocated processing time unused by a HRT thread in the order defined by the sequential list;
determining whether a first NRT thread identified by a current entry of the sequential list is able to be executed during the current execution cycle, and selecting the first NRT thread as the scheduled thread when it is able to be executed;
in response to determining that the first NRT thread is unable to be executed during the current execution cycle, accessing a round-robin scheduler to select a schedulable NRT thread from the plurality of NRT threads as the scheduled thread; and
executing an instruction of the scheduled thread via a pipeline using the allocated processor resources.

8. The method of claim 7, further comprising:
associating a priority level with each NRT thread of the plurality of NRT threads via the round robin scheduler, wherein the schedulable NRT thread is the NRT thread of the plurality of NRT threads having a highest priority level of the plurality of NRT threads and is able to be executed in the current execution cycle.

9. The method of claim 8, further comprising:
associating a lowest priority level with the schedulable NRT thread by the round-robin scheduler in response to the schedulable NRT thread being selected as the scheduled NRT thread.

10. The method of claim 7, further comprising:
incrementing the current entry of the sequential list in response to the first NRT thread being selected as the scheduled thread.

11. An apparatus comprising:
means for storing a plurality of hard real time (HRT) threads and a plurality of non-real time (NRT) threads, each HRT thread and each NRT thread including a corresponding plurality of instructions, wherein each HRT thread includes a corresponding HRT thread identifier (ID) and each NRT thread includes a corresponding NRT thread ID;
means for storing a plurality of entries each respectively corresponding to an execution cycle and associated with one of the HRT thread IDs, wherein the entries specify a temporal order in which processing time is allocated to the HRT threads;
means for storing a sequential list of one or more of the NRT thread IDs, wherein the NRT threads corresponding to the NRT thread IDs are allocated processing time unused by a HRT thread in the order defined by the sequential list;
means for accessing the means for storing the plurality of entries each execution cycle to retrieve the HRT thread ID associated with the entry corresponding to the execution cycle to determine whether one or more resources are available to a particular HRT thread identified by the retrieved HRT thread ID for the execution cycle;
means for accessing the means for storing the sequential list to retrieve the NRT thread ID at a current position in the sequential list and to determine whether the one or more resources are available to a first NRT thread identified by the retrieved NRT thread ID in response to the means for accessing the means for storing the plurality of entries determining that the one or more resources are not available to the particular HRT thread for the execution cycle;
means for identifying a schedulable NRT thread from the plurality of NRT threads in accordance with a round-robin algorithm in response to the means for accessing the means for storing the sequential list determining that the one or more resources are not available to the first NRT thread for the execution cycle;
means for selecting a thread from among the HRT threads and the NRT threads each execution cycle, and for retrieving an instruction of the selected thread in the execution cycle, wherein the particular HRT thread is selected in response to the means for accessing the means for storing the plurality of entries determining that the one or more resources are available to the particular HRT thread for the execution cycle, the first NRT thread is selected in response to the means for accessing the means for storing the sequential list determining that the one or more resources are available to the first NRT thread for the execution cycle, and the schedulable NRT thread is selected in response to the means for identifying a schedulable NRT thread identifying the schedulable NRT thread; and means for executing the instruction retrieved by the means for selecting a thread in one of a plurality of pipeline stages in the execution cycle.

12. A non-transitory-computer-readable medium comprising instructions that, when executed by a processor, cause the processor to select a thread from among a plurality of hard real time (HRT) threads and a plurality of non-real time (NRT) threads as a scheduled thread for a current execution cycle of a plurality of execution cycles, and to execute an instruction of the scheduled thread in the current execution cycle, the selecting comprising:

accessing a HRT thread table specifying a temporal order in which processing time is allocated to the HRT threads, wherein the HRT thread table comprises a plurality of entries, each entry corresponding to an execution cycle of the plurality of execution cycles and identifying one of the HRT threads;

determining whether a particular HRT thread identified by the entry corresponding to the current execution cycle is able to be executed during the current execution cycle, and selecting the particular HRT thread as the scheduled thread when it is able to be executed;

in response to determining that the particular HRT thread is unable to be executed during the current execution cycle, accessing a NRT thread table comprising a sequential list of one or more entries each identifying one of the NRT threads, wherein the identified NRT threads are allocated processing time unused by a HRT thread in the order defined by the sequential list;

determining whether a first NRT thread identified by a current entry of the sequential list is able to be executed during the current execution cycle, and selecting the first NRT thread as the scheduled thread when it is able to be executed; and in response to determining that the first NRT thread is unable to be executed during the current execution cycle, accessing a round-robin scheduler to select a schedulable NRT thread from the plurality of NRT threads as the scheduled thread.

13. The non-transitory computer-readable medium of claim 12 wherein each entry of the NRT table includes a status indicator for the NRT identified by the entry, wherein the status indicator indicates whether the NRT thread identified by the entry is valid.

14. An apparatus comprising:
a memory configured to store:
a plurality of hard real time (HRT) threads and a plurality of non-real time (NRT) threads, each HRT thread and each NRT thread including a corresponding plurality of instructions;
a HRT thread table specifying a temporal order in which processing time is allocated to the HRT threads, wherein the HRT thread table comprises a plurality of entries, each entry corresponding to an execution cycle of a plurality of execution cycles and identifying one of the HRT threads;
a NRT thread table comprising a sequential list of one or more entries each identifying one of the NRT threads, wherein the identified NRT threads are allocated processing time unused by a HRT thread in the order defined by the sequential list; and
a round robin scheduler; and
a processor coupled to the memory, the processor configured to select a thread from among the HRT threads and the NRT threads as a scheduled thread for a current execution cycle of the plurality of execution cycles, and configured to execute an instruction of the scheduled thread in the current execution cycle, the selecting comprising:
accessing the HRT thread table and determining whether a particular HRT thread identified by the entry corresponding to the current execution cycle is able to be executed during the current execution cycle, and selecting the particular HRT thread as the scheduled thread when it is able to be executed;
in response to determining that the particular HRT thread is unable to be executed during the current execution cycle, accessing the NRT thread table and determining whether a first NRT thread identified by a current entry of the sequential list is able to be executed during the current execution cycle, and selecting the first NRT thread as the scheduled thread when it is able to be executed; and
in response to determining that the first NRT thread is unable to be executed during the current execution cycle, accessing the round-robin scheduler to select a schedulable NRT thread from the plurality of NRT threads as the scheduled thread.

* * * * *